(12) United States Patent
Gysi et al.

(10) Patent No.: US 9,764,374 B2
(45) Date of Patent: Sep. 19, 2017

(54) APPARATUS AND METHOD FOR MANUFACTURING LIDS WITH TEAR-OFF FOIL

(71) Applicant: Soudronic AG, Bergdietikon (CH)

(72) Inventors: Peter Gysi, Bellikon (CH); Peter Taiana, Neuenhof (CH); Rene Raas, Fahrweid (CH)

(73) Assignee: Soudronic AG, Bergdietikon (CH)

( * ) Notice: Subject to any disclaimer, the term of this patent is extended or adjusted under 35 U.S.C. 154(b) by 817 days.

(21) Appl. No.: 14/170,672

(22) Filed: Feb. 3, 2014

(65) Prior Publication Data

US 2014/0147231 A1 May 29, 2014

Related U.S. Application Data

(62) Division of application No. 13/571,460, filed on Aug. 10, 2012, now Pat. No. 8,641,349, which is a division of application No. 12/512,364, filed on Jul. 30, 2009, now abandoned.

(30) Foreign Application Priority Data

Aug. 7, 2008 (CH) ........................................ 1233/08

(51) Int. Cl.
*B65G 15/12* (2006.01)
*B65G 47/00* (2006.01)
*B21D 51/44* (2006.01)
*B21D 43/12* (2006.01)
*B65G 15/14* (2006.01)

(52) U.S. Cl.
CPC ........... *B21D 51/443* (2013.01); *B21D 43/12* (2013.01); *B21D 51/446* (2013.01); *B65G 15/14* (2013.01); *B65G 2201/02* (2013.01)

(58) Field of Classification Search
CPC ....... B21D 43/12; B21D 51/443; B65G 15/14
USPC ......... 198/617, 620, 626.1, 817, 803.11, 728
See application file for complete search history.

(56) References Cited

U.S. PATENT DOCUMENTS

| | | |
|---|---|---|
| 3,779,364 A | 12/1973 | Kammann |
| 3,983,729 A | 10/1976 | Traczyk et al. |
| 4,213,324 A | 7/1980 | Kelley et al. |
| 4,546,873 A | 10/1985 | Debenham et al. |
| 4,641,742 A * | 2/1987 | Igarashi ............... B65G 15/105 198/626.5 |
| 4,671,720 A | 6/1987 | Debenham et al. |

(Continued)

FOREIGN PATENT DOCUMENTS

| | | |
|---|---|---|
| DE | 2924755 A1 | 1/1981 |
| WO | 0138207 A1 | 5/2001 |
| WO | 2006017953 A1 | 2/2006 |

OTHER PUBLICATIONS

European Search Report for Corresponding European Application No. EP 09 00 9733, dated Nov. 18, 2009.

*Primary Examiner* — Douglas Hess
(74) *Attorney, Agent, or Firm* — McCormick, Paulding & Huber

(57) ABSTRACT

In the area of manufacturing covers with tear-open foils, the cover blanks, or covers are always secured against an undesired take-off from the transport means during the transport and the processing. This allows a very high manufacturing cadence equally for light covers and particularly for aluminium covers.

14 Claims, 14 Drawing Sheets

(56) References Cited

U.S. PATENT DOCUMENTS

| | | | | |
|---|---|---|---|---|
| 4,893,707 A * | 1/1990 | Langen | ............... | B65G 17/26 |
| | | | | 198/626.3 |
| 5,038,919 A * | 8/1991 | Harston | ............... | B65G 17/26 |
| | | | | 198/626.1 |
| 5,238,101 A * | 8/1993 | Ota | ............... | B65G 17/26 |
| | | | | 198/626.5 |
| 5,560,473 A * | 10/1996 | Ivancso, Jr. | ............... | B65B 59/005 |
| | | | | 198/803.11 |
| 6,105,341 A | 8/2000 | Campbell | | |
| 6,524,048 B1 | 2/2003 | Tsukada et al. | | |
| 6,772,875 B2 * | 8/2004 | von Seggern | ............... | B65G 17/08 |
| | | | | 198/459.7 |
| 6,823,987 B2 * | 11/2004 | Sartore | ............... | B65G 17/26 |
| | | | | 198/803.11 |
| 7,377,378 B2 * | 5/2008 | Cash, III | ............... | B65G 17/26 |
| | | | | 198/803.11 |
| 7,717,253 B2 | 5/2010 | Lord | | |
| 7,752,828 B2 * | 7/2010 | Gudim | ............... | B65B 5/068 |
| | | | | 198/803.11 |
| 7,942,398 B1 * | 5/2011 | Marcinik | ............... | B43M 3/04 |
| | | | | 198/626.5 |
| 8,641,349 B2 * | 2/2014 | Gysi | ............... | B21D 43/12 |
| | | | | 198/803.11 |
| 2007/0074557 A1 | 4/2007 | Takada et al. | | |
| 2007/0113985 A1 | 5/2007 | Gysi et al. | | |
| 2007/0258803 A1 | 11/2007 | Gysi | | |

\* cited by examiner

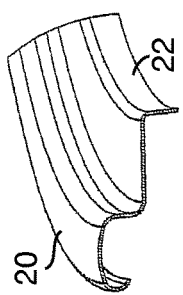
FIG. 3
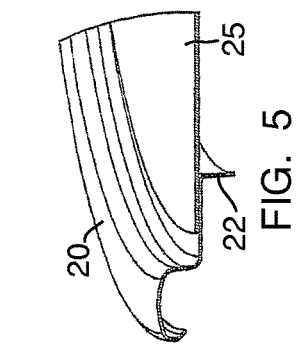
FIG. 6
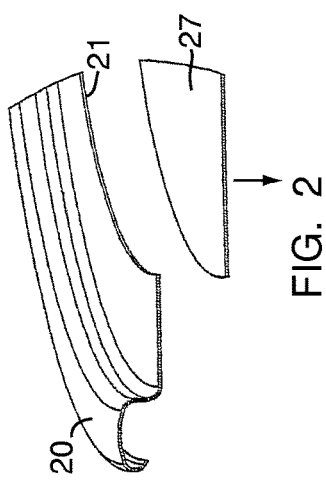
FIG. 2
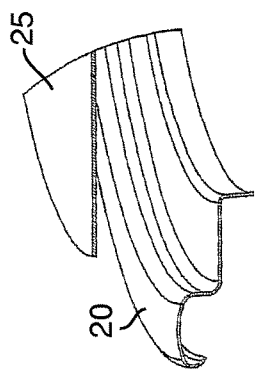
FIG. 5
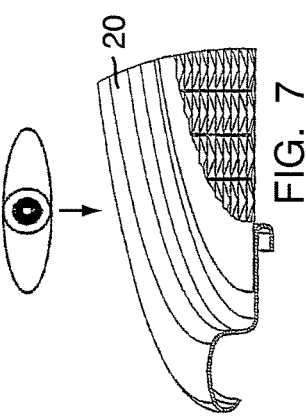
FIG. 7
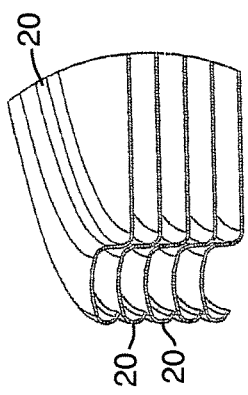
FIG. 1
FIG. 4

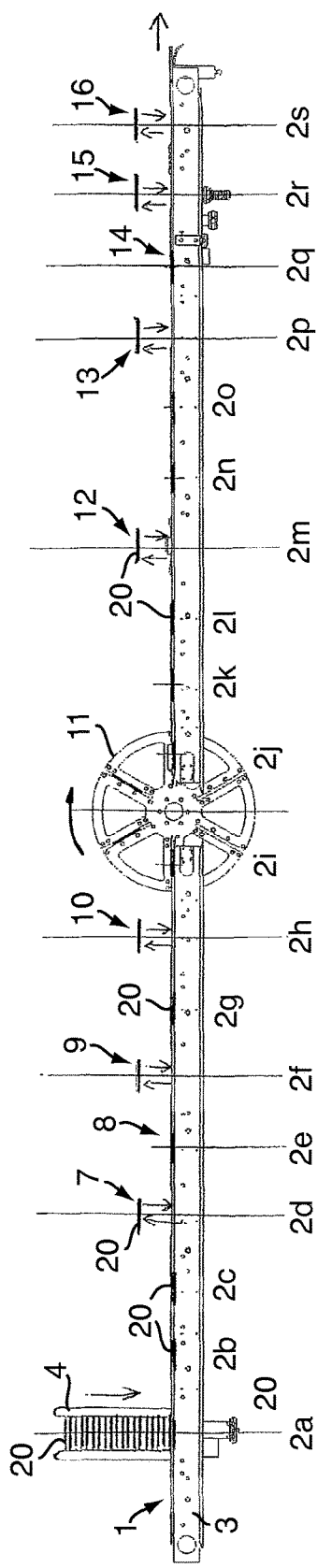
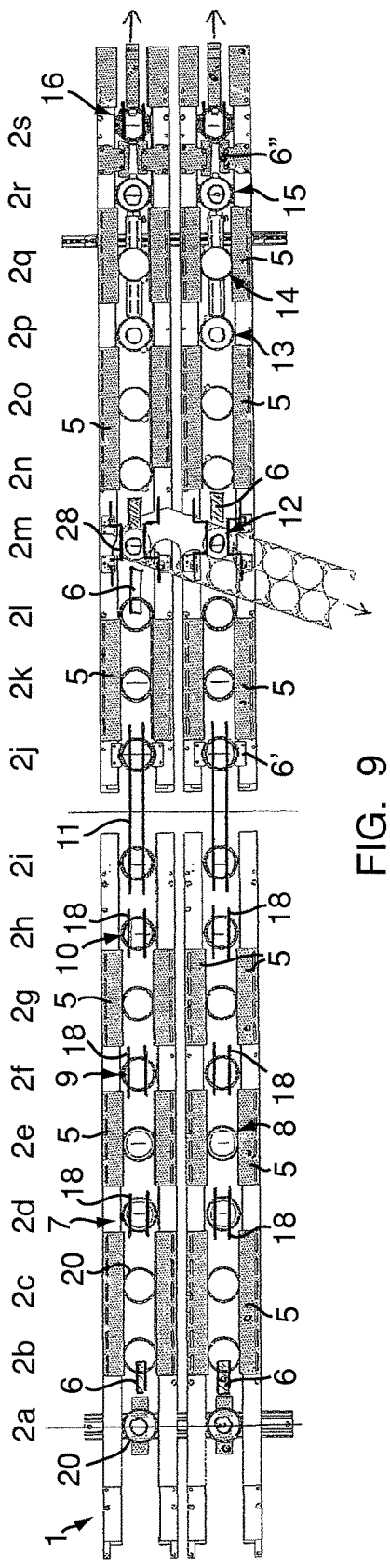
FIG. 8
FIG. 9

APPARATUS AND METHOD FOR MANUFACTURING LIDS WITH TEAR-OFF FOIL

CROSS REFERENCE TO RELATED APPLICATIONS

This application is a divisional application of U.S. patent application Ser. No. 13/571,460, filed Aug. 10, 2012, which is a divisional application of U.S. patent application Ser. No. 12/512,364, filed Jul. 30, 2009, and claims the benefit of Swiss Application No. 1233/08, filed Aug. 7, 2008. The disclosures of each of these applications are incorporated by reference herein in their entirety.

BACKGROUND OF THE INVENTION

The invention relates to an apparatus for the manufacturing of container covers or lids, respectively, with a tear-open foil, comprising a linear transport means for the horizontal transport of lid parts and lids along the manufacturing line, wherein the lids are secured against a take-off in a vertical direction along a part of the manufacturing line by means of a guidance, at least a de-stacker arranged at the beginning of the transport means, which delivers blank lid parts from at least one stack to the transport means, a sequence of working stations arranged along the transport means, optionally including a turning station, and a discharge station at the end of the linear transport means. Furthermore the invention relates to a method for the manufacturing of container lids or covers, respectively, with a tear-open foil. Furthermore the invention is related to another apparatus for the manufacturing of covers or lids, respectively with tear-open foils with a transport means providing a linear transport path with successive receptions for blank lid parts formed by reception parts of the transport means. Furthermore the invention relates to another method for the manufacturing of covers or lids, respectively with tear-open foils, the lids having different diameters.

PRIOR ART

It is known how to manufacture covers or lids, respectively, for can-like or box-like containers as metal covers which are permanently attached on top of the package and which provide an extraction opening which is sealed until the first use of the container contents by means of a foil, particularly a metal foil, applied by heat-sealing and which can be torn-off. An additional plastic cover which is arranged above the metal cover makes the package resealable during the period of consumption of its contents. Manufacturing steps during the manufacturing of such so-called tear-open or tear-off covers or lids will be explained in the following on the basis of the FIGS. 1 to 7. An apparatus for the manufacturing of tear-open covers of the above type is known from WO 2006/017953. It comprises a linear transport means for the transport of the covers within the apparatus along their manufacturing line, wherein the transport means secures the covers mechanically or magnetically against a take-off out of the cover reception during their horizontal linear motion on a part of the transport path.

BRIEF SUMMARY OF THE INVENTION

The mentioned apparatus has proven itself and allows the high production rate manufacturing of ordinary covers or lids made of tinplate or sheet steel, which can amount to for example 200 covers per minute. It is preferable to equally reach such cadences for very light covers made of light metal, particularly aluminium.

This task is accomplished within the aforementioned apparatus in such a way, that securing means for the conveying of the covers from the blank state to the state of finished cover throughout the apparatus, which are permanently effective from the de-stacker to the discharge station, are provided, which securing means always secure the cover parts against an undesired take-off from the transport means.

Also very light covers can be manufactured with high rate by means of the permanent securing along the manufacturing path of the cover parts which are moved intermittently through the apparatus, thus especially a securing in the processing stations as well as in the transfer from the de-stacker to the linear transport means and into the discharge station. In ordinary apparatus there is the risk with such light covers, that the covers jump out of their receptions in the transport means in the area of the processing stations because of the permanent start-up and stop of the transport means or because of small outside influences, which can lead to an interruption of the manufacturing.

Within a preferred apparatus, the securing means are engineered with a combination of fixed securing elements and movable securing elements, and particularly also with securing elements which act using negative pressure or vacuum, respectively. The combination of different securing means and securing elements, respectively, yields a continuous positive guidance of the cover parts and covers, respectively, which is particularly well adapted to the cover manufacturing. At the de-stacker, it is preferably carried out by means of vacuum as well as mechanical down holders, thus allowing the secure and constantly held delivery of the cover blank from the de-stacker to the linear transport means or conveying means, respectively. Then, movable securing elements are preferred as securing means in processing stations, providing an always secure holding of the cover parts despite the motion requirements in the processing stations. Particularly, the movable securing elements are formed by rails, which are arranged in a springy way within the upper part of the tool and extend in transport direction, and are particularly to be found in the cutting station and the punching station, respectively, in which the extraction opening is cut out of the cover blank. Equally, movable securing elements can be provided within a forming station and/or a rolling station and/or in an embossing station.

Within the transport means itself, the positive guidance is particularly formed by fixed covering elements which are located on both sides of the longitudinal transport axis, with safety plates which are bend down with respect to the cover parts, such for example in a oiling station which is located between the cutting station and the forming station, and also along conveying sections for the cover parts in which no processing occurs. Inasmuch as a turning station is provided, fixed infeed elements can for example be provided as securing means for the transfer from the linear transport means to the turning station.

Preferably both fixed and movable securing elements are particularly provided at the foil punching and pre-sealing station as securing means or positive guidance, respectively, which comprise vertically springy relocatable rails as movable securing elements in the area of the upper sealing tool and which comprise down holders as fixed securing elements, whereas a holding or a positive guidance, respectively, which acts by means of low pressure is provided within the lower sealing tool, thus resulting in a high reliability of the constant holding of very light cover parts in this step which is particularly important for the manufacturing. In addition, the springy movable securing elements act as ejectors from the upper tool after the processing of the cover part.

Preferably fixed and movable securing elements, which are preferably provided in the same combination as in the pre-sealing station, are equally provided in the main sealing station.

If an inspection station for checking the sealing joint, particularly for a check by thermal image evaluation, is provided, the securing means respectively the positive guidance are preferably formed by a vacuum guidance, thus not disturbing the view of the sealing area.

In another aspect of the invention which can be combined with the first aspect, which however can also be applied for itself and thus equally for apparatus of prior art, tappets for forming the respective reception for the cover parts, particularly having a shape of entraining lugs arranged at a toothed belt on each side of the longitudinal central axis of the transport means with mutually different distances, are arranged at the linear transport means in a way resulting in receptions for two cover parts of different sizes, alternating along the transport. This allows the use of the apparatus for cover parts of different diameters without refitting the apparatus, by respectively loading only the fitting receptions while the other receptions remain empty. The transport means then carries out transport steps with double length, such that only the receptions of the one size loaded with the cover parts come to be located stationary in the processing station and the other empty receptions of the other size are transported substantially without stopping through the processing stations.

Furthermore it is the object of the invention to improve a method for manufacturing tear-open covers.

This is achieved according to a method for manufacturing covers with a tear-open foil on a linear manufacturing apparatus, on which the cover blanks and the covers are being de-stacked and conveyed and at the same time cut, possibly oiled, formed, rolled and then possibly turned, on which the tear-open foil is applied and pre-sealed, to which a main sealing, possibly an inspection, a cooling, an alignment of the tear-open strap and a check is carried out, characterized in that during these steps a securing against an undesired take-off of the cover blanks respectively of the cover out of their reception at the transport means always takes place by securing means.

Within the method, the holding is preferably carried out by fixed securing elements and by means of movable securing elements, and particularly also by means of securing elements acting with a vacuum.

The securing at the de-stacker takes place particularly by means of a vacuum as well as by means of down holders and movable securing parts are used for the securing in the processing stations. For example the guiding respectively the holding of the cover part takes place by means of securing parts which are springily arranged in the upper tool part, which is particularly advantageous in a cutting station and/or a forming station and/or a rolling station and/or a embossing station. Furthermore, in an oiling station which is located between the cutting station and the forming station, the securing particularly takes place by means of fixed securing elements, particularly by means of covering elements with guide noses which are located on both sides of the longitudinal transport axis.

Preferably fixed and movable securing elements are used for the securing against the take-off during foil stamping and pre-sealing, wherein particularly in the area of the upper sealing tool eject runners or rails which are arranged springily in the tool, are provided as movable securing elements and down holders are provided as fixed securing elements and a holding acting by means of a vacuum is used as positive guidance in the lower sealing tool. The latter can be interrupted by for example a controlled air supply.

Also for the main sealing fixed and movable securing elements are preferably provided for holding, particularly in the area of the upper sealing tool eject runners are provided as movable securing elements and down holders are provided as fixed securing elements and the holding in the lower sealing tool takes place by means of low pressure, which is interruptible particularly by means of a controlled air supply.

If an inspection station for the checking, particularly the optical checking, of the sealing joint is provided, the securing is preferably provided by means of low pressure. In case of a cooling and a strap aligning station it is proceeded in a way, that the adherence of the cover to a lower turntable takes place by means of low pressure.

Within the linear transport means with tappets which are arranged at revolving belts, bands or chains, the positive guidance is carried out particularly by means of cover plates with securing bridges showing downwards, which are arranged on both sides of the longitudinal central axis of the transport means above the transport plane. Thereby the tappets respectively the entraining lugs are preferably arranged on each side of the longitudinal central axis with mutually different distances respectively lug distances.

Furthermore the invention is related to the task of simplifying the manufacturing for cover parts with different diameters within the cover manufacturing of tear-open covers with a linear transport means with tappets arranged at bands, belts or chains, particularly according to the described method, but equally for methods according to the prior art.

This is solved in such a way that the receptions for the tappets forming cover parts, which particularly are entraining lugs, are arranged on each side of the longitudinal central axis with mutually different lug distances, and that, depending on the cover diameter, a loading with the cover parts takes place either into the receptions with the one tappet distance from each other or into the receptions with the other distance from each other. Thereby it is possible to allow the manufacturing for two different cover diameters without time consuming refitting of the transport means.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1 to FIG. 7 show sectors of tear-open covers for the explanation of steps for their manufacturing;

FIG. 8 shows a simplified side view of an apparatus for the manufacturing of tear-open covers by means of another order of steps;

FIG. 9 shows a top view onto the apparatus of FIG. 8;

DETAILED DESCRIPTION OF THE INVENTION

Figure 10:
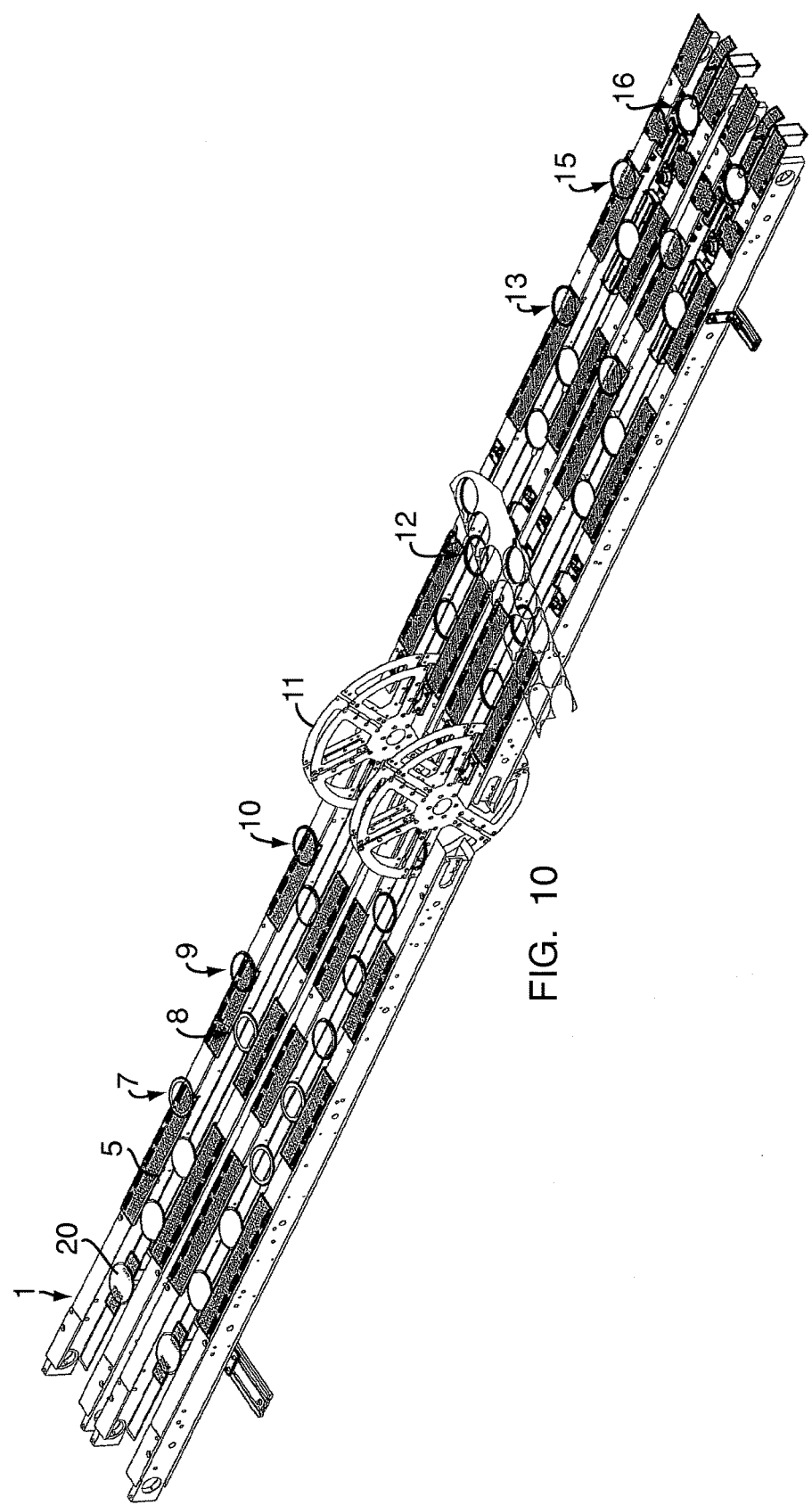
FIG. 10 shows a graphical view of the apparatus of FIG. 8.

The prior art for the manufacturing of metal container covers or lids with a tear-open foil will be shortly explained by means of the FIGS. 1 to 7. FIG. 1 shows stacked metal cover blanks 20 as an example for items as they can be found in the stack. These cover blanks 20 are for example round metal discs or slices, respectively, of for example 11 cm of diameter. Naturally, other basic shapes, for example square or rectangular slices and other diameters are possible without further ado. The cover blanks 20 have already been pre-shaped beforehand at their edges, as shown in FIG. 1, in a processing machine not shown here. In FIG. 1 and the following figures only a sector of the entire slice is shown respectively, in order to simplify the figures. First the cover blanks 20 are released one by one from the stack by means of a de-stacker and passed on to receptions, particularly with reception lugs, of the linear conveying means which transports the cover blanks and later the covers stepwise and brings them to the individual processing or working stations, respectively, whereat the linear conveying is interrupted in order for the processing to be carried out. Once the processing has been carried out on the cover parts or covers, a further transport to the next processing station is carried out. In the first processing station, which subsequently will be called cutting station, an opening is punched into the part 20 by means of a punching process with upper and lower tool, which can be seen in FIG. 2, wherein the edge of the opening is denoted with 21 and the punched out round slice with 27, which is disposed of as debris. The cutting station is driven by an actuator, like it is the case for the subsequent stations. An oiling can be carried out for the next processing steps within the next processing station along the linear transport path and then a forming of the edge 21 is carried out in the next processing station in the figure downwards, whereby the course 22 of the edge, shown in FIG. 3 is reached (in case of a modified following embodiment, whereby the cover blanks initially lie turned by 180°, the forming would on the other hand be carried out in the figure "upwards"). Afterwards the ring-shaped cover blanks 20 reach a processing station, in which a foil is placed over the opening of the cover and attached there by means of hot-sealing, which can be seen in the FIGS. 4 and 5. The tear-off foil can be a metal foil, a plastic foil or a combined foil including layers of metal and plastic material. The foil 25 is provided with a plastic layer on its bottom side that provides for the heat sealing. The required round foil cut 25 is normally itself punched out of a wide foil web in the heat sealing station and placed over the central recess of the ring-shaped slice and the foil is pressed at the edge of the round recess of the part 20 by the heating effect of the heat sealing station, such that the foil 25 is tightly jointed with the metal cover 20 by melting and subsequent cooling of the plastic layer. This is known and will not be explained in more detail here. Particularly the steps can equally be carried out in two stations, wherein in one station a punching of the foil and a pre-sealing of it to the cover ring and in a subsequent main sealing station the final sealing is carried out. A further processing station can be provided for the cooling. The foil 25 may be provided with an embossing 24 (FIG. 6) in a further processing station and in the following the edge 22 is beaded as the final edge 23 (in the following described embodiment this beading respectively rounding step is on the other hand carried out after directly after the forming of the edge). Now, within an inspection station, which should be equally termed processing station, the finished covers undergo a checking, which comprises a leak testing for the peel-off foil 25 which is attached onto the cover and/or an optical checking by means of a heat detection camera which can detect insufficiently heated parts of the sealing joint. If the foil is attached to the rest of the metal cover in a leak proof way, the cover ends up in the discharge station. If a leak is detected, the cover ends up on a chute, into a debris bin or an appropriate elimination is carried out at the exit of the station.

The FIGS. 8, 9, 10 now show in a simplified side view as well as top view and in a graphical representation an embodiment of the apparatus for manufacturing tear-open covers according to the invention in a simplified manner. Thereby, particularly the de-stacker is shown in a simplified way and the processing stations are only indicated insofar, that at their position the respective cover blank to be processes respectively cover is shown above the transport means, because the processing station has lifted the cover blank or the cover, respectively, for processing from its reception in the transport means. The individual processing stations and the de-stacker are basically built for the processing operations and for the de-stacking according to the prior art and are known to the skilled person and therefore do not have to be discussed in detail here. But the securing of the cover parts and covers, respectively, along the manufacturing path will be shown more precisely in the following. In this example the stations are arranged one after the other according to the sequence in the manufacturing path as discussed in the following. Here, a slightly modified manufacturing sequence along the manufacturing path is described as compared to the example of FIG. 1 to FIG. 7.

Figure 11:
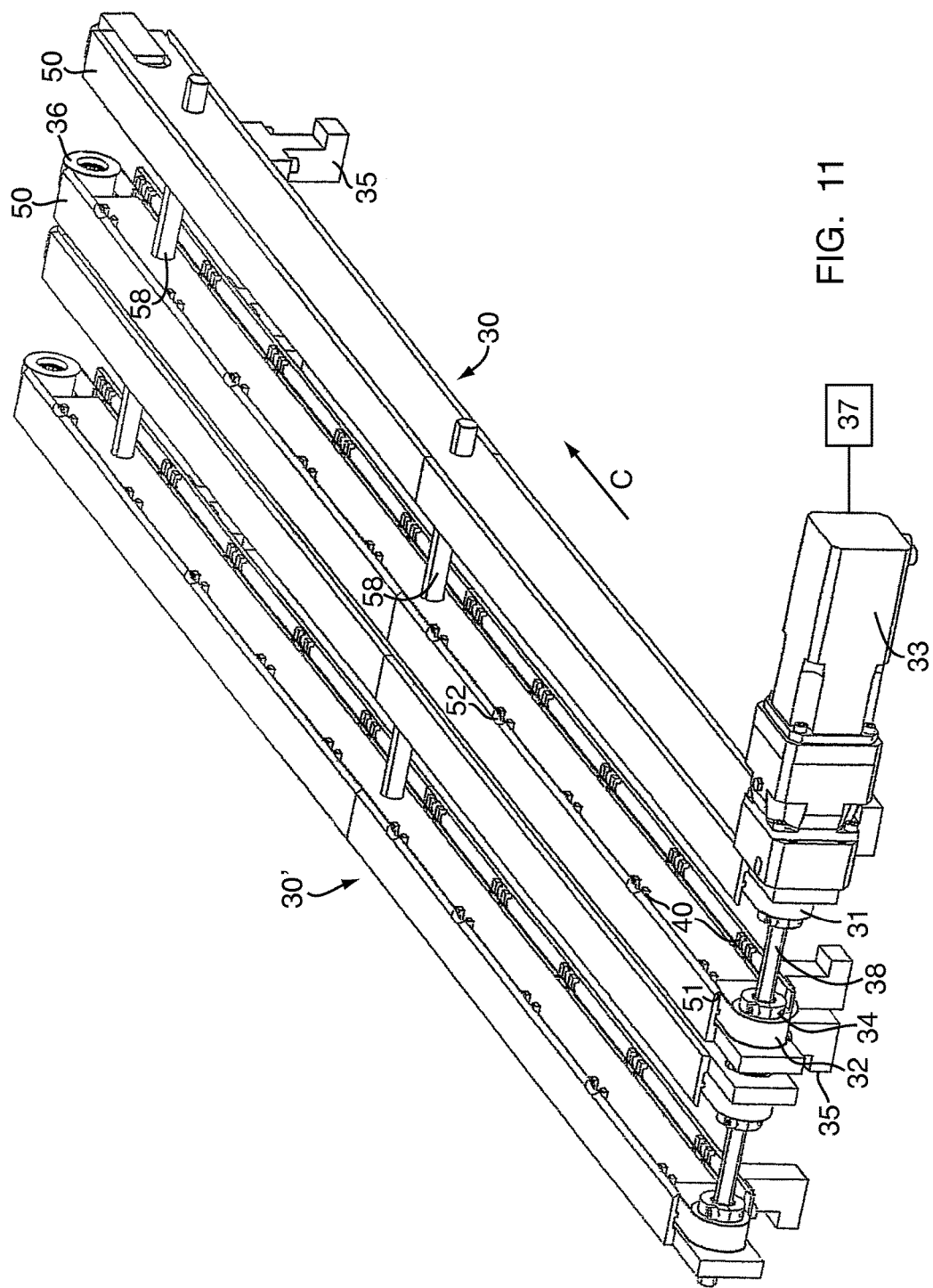
FIG. 11 shows a graphical view of an embodiment of the transport means, as known from the prior art.
Figure 12:
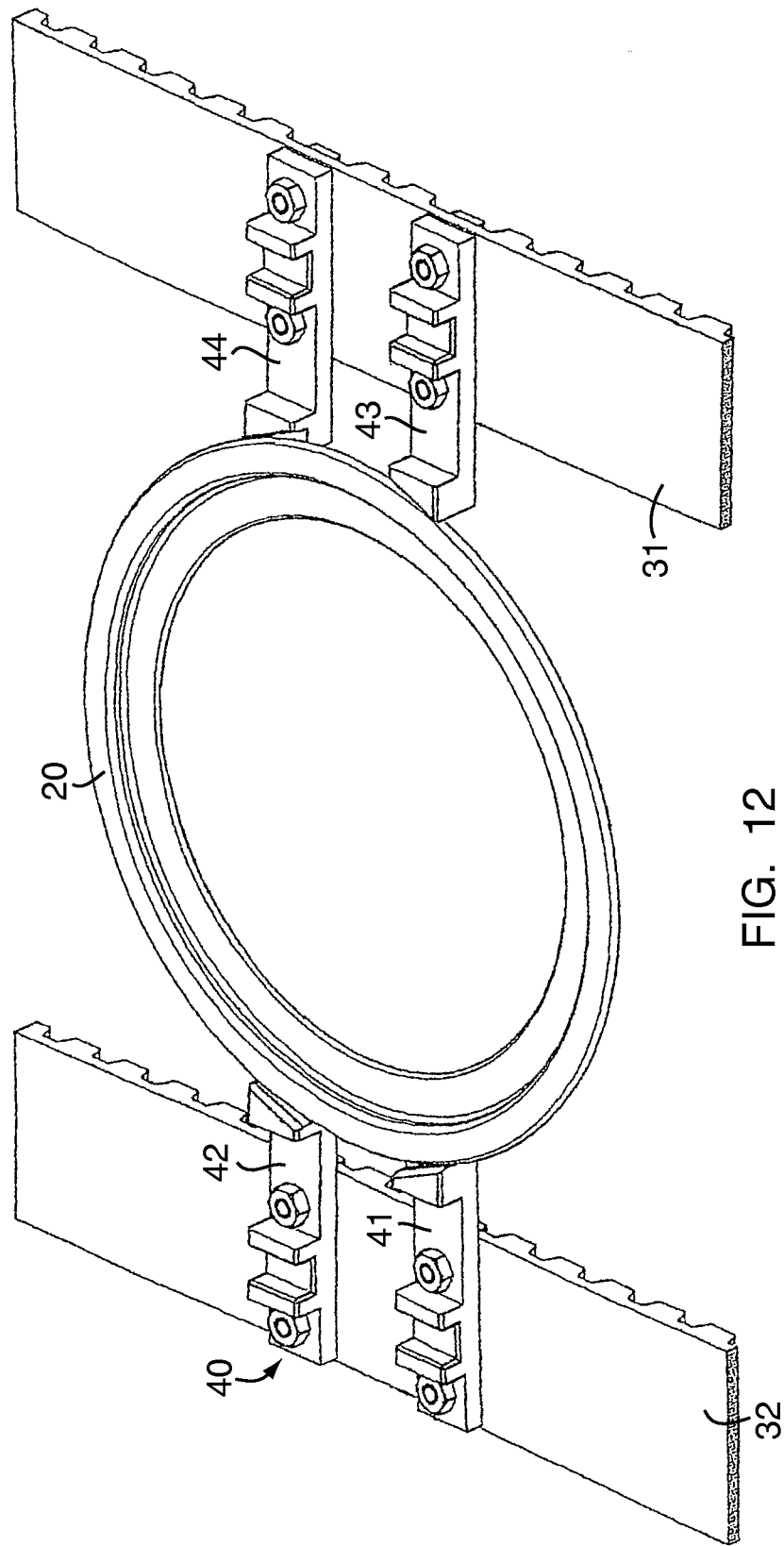
FIG. 12 shows a graphical view of the receptions for the cover blanks respectively covers at the transport means.

In this example the apparatus 1 has a transport means 3 with two parallel transport paths, such that two streams of covers can be manufactured at once. Equally, only one transport path or more than two transport paths could be provided. The transport means has, particularly for each transport path, two rotatingly actuated toothed belts which are arranged parallel in a distance from each other, to which lugs are attached, not being shown in FIGS. 8, 9 and 10. Two pairs of opposed lugs provide a reception for a cover part or cover, as known from the international patent application WO 2006/017953, which contents are incorporated herein by reference. For the purpose of a short explanation of such a transport means 3, FIG. 11 and FIG. 12 show in a graphical manner a transport means which is used for the sequential conveying of the covers to the individual processing stations. These processing stations are also not shown in FIG. 11, however it is clear for the skilled person how they can be arranged along the conveying device in order to carry out the respective processing. In FIG. 11 equally two transport paths are shown. They can be actuated by means of the same drive 33, 37 or they can each possess an own drive. By means of the shown transport means the cover parts or covers can be conveyed to the processing stations with a high rate of for example 200 covers per minute and with exactly reproducible step lengths. Furthermore a flexible concept for a large array of formats of the covers results, which can reach from for example a diameter of 50 to 200 mm for round covers and which can also take on various rectangular formats, for example for the usual fish cans. In this way, the transport means is executed as a compact module for a one path or, as shown, a multiple paths setup.

Within the shown preferred arrangement, the transport means has two toothed belts 31 and 32, which are particularly located with their surfaces in the same plane, thus run coplanar, and which are guided via deflection rollers at the beginning and at the end of the conveying device, such that an endless toothed belt actuator with the length required for the number of processing stations results. The stepwise motion of the toothed belt, which is synchronised with the processing stations, is caused by a step motor or servo motor which actuates the toothed belts by means of tooth rollers, as can be seen in FIG. 11 with the motor 33 and the drive shaft 38. If further transport paths are provided, their toothed belts can be actuated by means of the same motor via further drive shafts or possess an own motor. The motor 33 is controlled by means of a controller 37 for the undertaking of the stepwise forward motion of the toothed belt, which controller 37 is either an entire controller of the cover manufacturing apparatus, which equally controls the processing stations, or which controller 37 is a controller for only the transport means, which communicates with a superordinate controller for the cover manufacturing apparatus. The motor 33 and the further actuator components for the toothed belts are arranged at a machine frame which is indicated in the figure only by the feet 35. The tappets for taking up the covers, particularly provided by entraining lugs, are attached at the toothed belts, forming the receptions for the covers and which are generally labelled with 40 in FIG. 11, wherein the opposed tappets of the toothed belts 31 and 32 form a reception for the respective cover part or cover, respectively. This reception, formed by the tappets 40, is moved by means of the toothed belt motion along the conveying path and in direction of the shown arrow C from the beginning of the transport means, which here is located on the motor side, to the discharge side at the deflection roller 36, where the discharge station for the covers is located. In the shown embodiment a covering 50 is provided respectively above the toothed belt and above the lugs 40, which covers the toothed belt and a part of the lug respectively, which will be discussed in more detail in the following. In the area of the processing stations the covering 50 has respectively a recess 52, which allows a taking out of the objects from the receptions in order for the object to be lifted from the lug and processed in the processing station and subsequently given back to the reception. Usually no recesses 52 are provided between the processing stations, such that the take-off of the objects from the lugs is blocked by the covering in that area. Additionally to the blocking of the take-off by means of the covering 50, the tappets can be magnetically formed, which can also prevent a take-off of the objects during the conveying step, if the object consists at least partly of a magnetically gripable material. It is preferred that the mutual distance of the toothed belts 31 and 32 is adjustable, whereby the distance of the opposed lugs 40 of both toothed belts is adjustable in order to adapt the transport means to different object sizes. For this purpose cross connections 58 can be provided at the transport means, which allow a simple adjustment of the mutual distance of the toothed belts. The drive shafts 38 are arranged accordingly, in order to make this distance adjustment possible. In FIG. 12 the tappets, which are generally labelled with 40, are shown as entraining lugs 41 and 41 on the toothed belt 32 and as entraining lugs 43 and 44 on the toothed belt 31 and it is evident how the cover ring 20 is carried and transportable by the entraining lugs, wherein the tappets allow the upward take-off of the cover ring respectively of the cover, which is necessary within the processing stations and also allow the loading from the top within the de-stacker.

The mutual distances of the entraining lugs on the respective toothed belt are given by the division of the toothed belt and the tappet attachment. This distance can be changed in such a way for an adjustment to the cover size, that the toothed belts are changed with a set of other toothed belts with entraining lugs which are attached in another mutual distance. In this way a large reception size range for covers can be created by mutual distance adjustment of the toothed belts and by changing the toothed belts with differently spaced tappets. In this way, a refitting to different object sizes for all tappets can be carried out simultaneously. However, in the following a further aspect of the invention will be explained, which allows the processing of covers of different sizes in another way which makes the changing of the toothed belts for the manufacturing of covers with two different diameters obsolete.

The tappets 41 to 44 are attached to the toothed belt in a known way, by taking off the respective tooth of the toothed belt and changing it with an attaching element which is screwed to the tappets. This way of attachment is known to the skilled person and will not be further shown here. Surely, all further attachment possibilities of tappets to tooth belts are equally applicable, like for example the adhesive bonding attachment of tappets.

Figure 13:
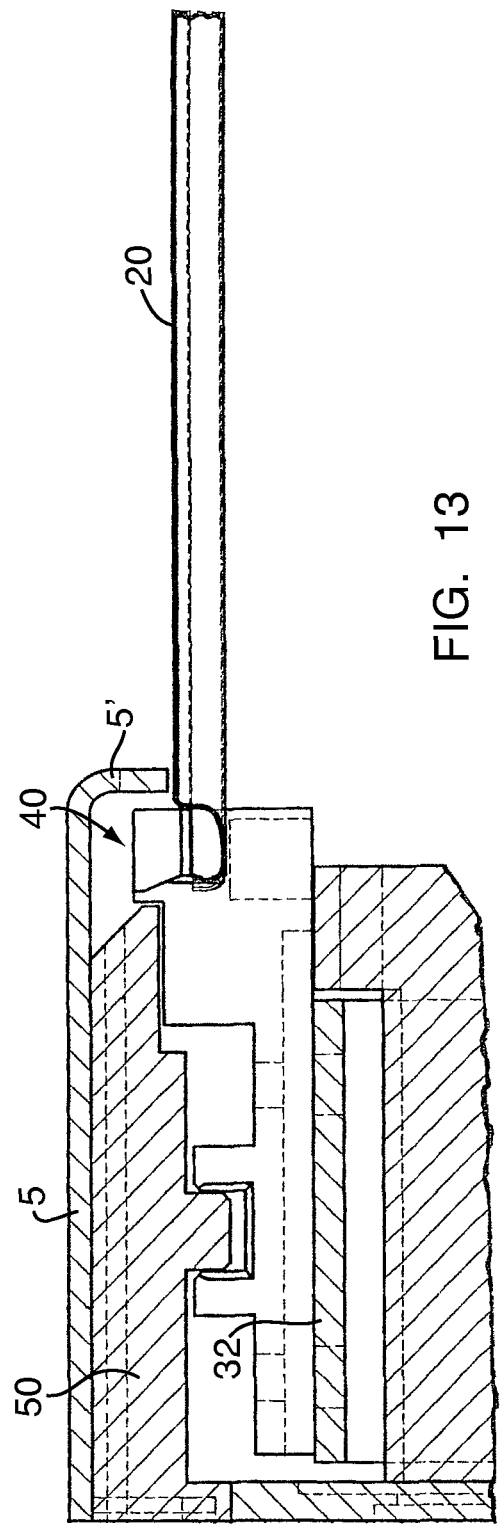
FIG. 13 shows a vertical section view of a part of the transport means with the covering with a bent down bridge for securing.

Coming back to FIGS. 8, 9 and 10 it is shown that at the beginning of such a transport means 3 a de-stacker 4 is provided, which releases the cover blanks 20 downwards from two stacks in a cyclic way and therefore passes them one by one to the respective ready receptions of the transport means 3. In this example this is carried out with a start position of the cover blanks which is turned by 180°, such that the side of the cover blanks which is supposed to be provided with the tear-open foil first comes to lie downwards in FIG. 1 and a turning has to occur along the transport path, when the tear-open foil is applied from the top. This will be discussed in the following. FIGS. 9 and 10 respectively show a cover blank 20 in the respective reception of the transport means 3 underneath the de-stacker. From this position 2a on along the manufacturing path up to the discharging of the finished covers, the cover blanks are all the time secured against an undesired take-off and falling out of the reception. In a preferred way securing the cover blanks in the reception underneath the de-stacker is provided such that underneath both receptions air is being sucked in and thus a low pressure is created beneath the cover blanks. After the securing by vacuum in this way which just acts in this position 2a, a central down holder 6 which is arranged above and with little distance to the respective cover blank, is preferably arranged for example in the shape of a large rail which is attached to the bottom side of the de-stacker. This down holder acts for securing while the covers blanks are moving from the position 2a to the following position 2b. However, if necessary, the securing extends by means of the low pressure also from the area of de-stacking further in longitudinal direction of the transport means respectively further along the manufacturing path, at best partly intersecting with the securing by the down holder 6. Before the down holder 6 ends in longitudinal direction, side guidances 5 take over the securing against the take-off of a cover blank, which is transported stepwise from the position 2a beneath the de-stacker into both further positions 2b and 2c, wherein no processing occurs. According to FIG. 13 (which only shows a single side of the reception), the side guidances 5 are (compared to the coverings 50 according to the prior art in FIG. 11) arranged in such a way, that they provide a bridge 5' which points downwards in the direction of the cover blank 20 and the reception of the transport means. This leads to a good securing against the take-off of the cover blank during the conveying by the transport means. Afterwards, with the next transport step, the cover blank 20 reaches the position 2d, wherein a stopping occurs again and the cover blank has reached the processing station 7, wherein the cutting off of the part 27 takes place (FIG. 2). This takes place in a known way, wherein the processing station moves the cover blank out of the reception upwards, whereafter the cutting respectively the punching operation takes place according to the prior art by means of an upper tool and a lower tool respectively of stamp and stencil. The securing against the take-off in the position 2d takes place by means of movable securing elements, which are formed by down holders 18 within the upper tool, which, in the shown example of FIG. 13, are arranged springy in vertical direction and which extend in longitudinal direction of the transport means, as indicated in FIG. 9. These down holders 18 secure against a take-off of the cover blank by ending, in their idle position, in a small distance above the cover blank (by means of a stroke which is not shown, which limits the way downwards of the down holder 18 in the figure). The down holders 18 start and end along the transport path in such way, that they are arranged in an intersecting way with the coverings 5 (FIG. 9), such that a continuous securing during the transport of the cover blank from the position 2c into the processing position 2d and after the processing into the further position 2e results. The down holders 18, which are arranged upwards resiliently with the springs 19, contact the cover blank during its lift up by the lower tool when the cover blank is brought into the processing position above the reception in the transport means, however they springily retract, such that no hindering of the lift up by the lower tool results; however the down holders avoid an undesired take off of the cover ring just by its transport motion or outer influences before and after the lower tool has lifted up respectively has put down again the cover ring. In FIG. 8 and FIG. 10 the cutting respectively the processing station 7 is only shown by the cover blank 20 which is shown above its reception.

In the position 2e an oiling of the cover blank 20 can be carried out as a processing step, as preparing step for the subsequent forming of the edge (FIG. 3), wherein the securing against the take-off can be carried out for the oiling in the processing station 8 by means of the covering 5 and the bridge 5', as shown in FIG. 12.

Figure 14:
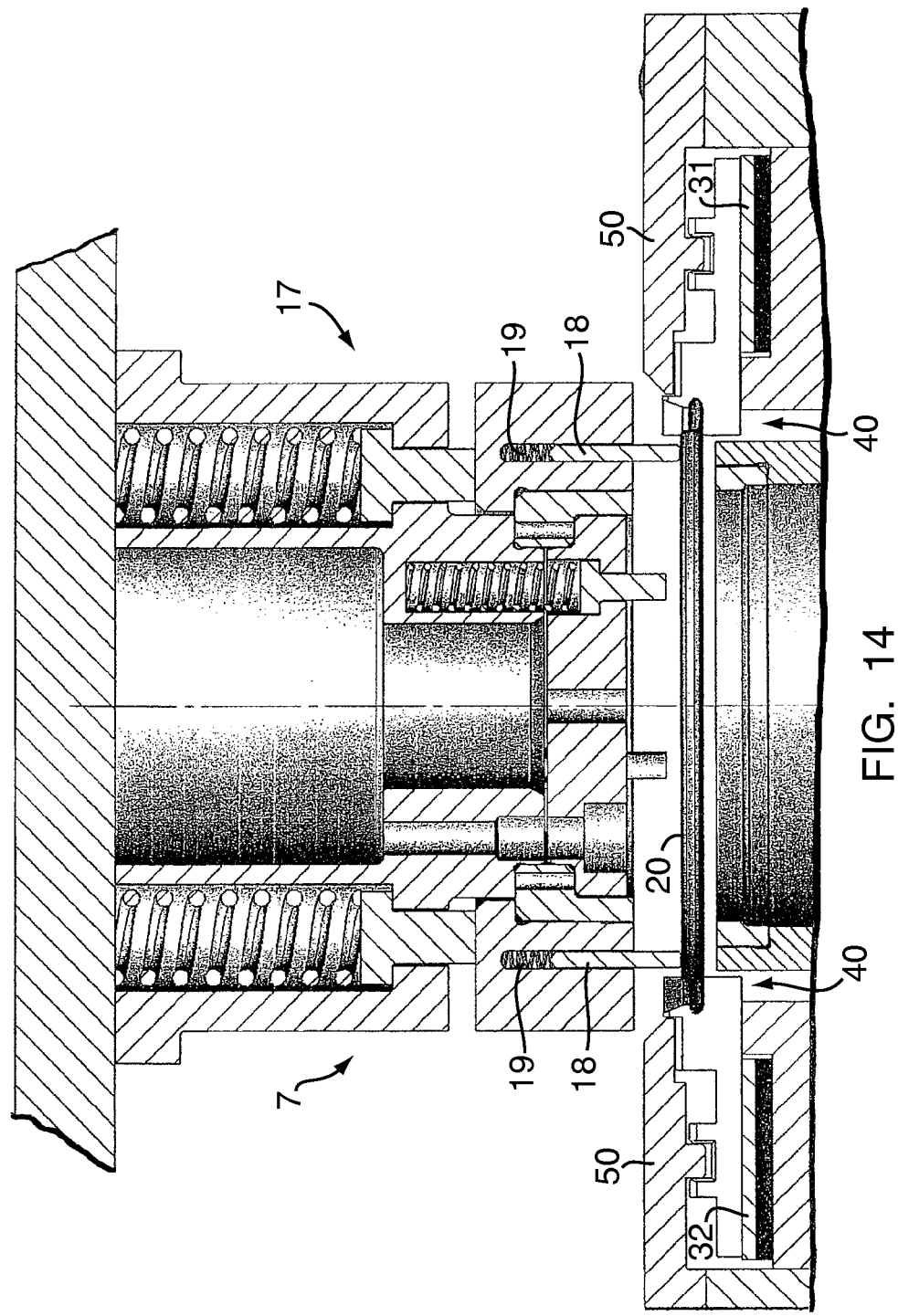
FIG. 14 shows a vertical section view of a part of the cutting process station with movable securing elements within the upper tool.

The forming of the edge of the extraction opening of the tear-open cover (FIG. 3) takes place in the position 2f along the transport path, for which also an upper and a lower tool are provided within a processing station 8, as shown in FIG. 14. For the securing against the take-off of the cover blank before its holding within the tool itself, movable down holders are preferably provided analogue to the solution at the cutting process station. A vertical section view of the forming process station 9 is shown in FIG. 14, wherein movable down holders 18 are equally provided. Thereby the springs are not shown in this section view. After the processing of the edge of the extraction opening by the forming, a transport of the cover blank with the formed edge into the position 2g, in which no processing occurs, is carried out, while with this transport step the subsequent cover blank comes into the position 2f. In the position 2g the securing against the take-off is carried out again with the covering 5 and the bridge 5', as shown in FIG. 13. This securing intersects in transport direction with the down holders 18 of the forming process station, such that a continuous respectively an uninterrupted securing results.

Figure 15:
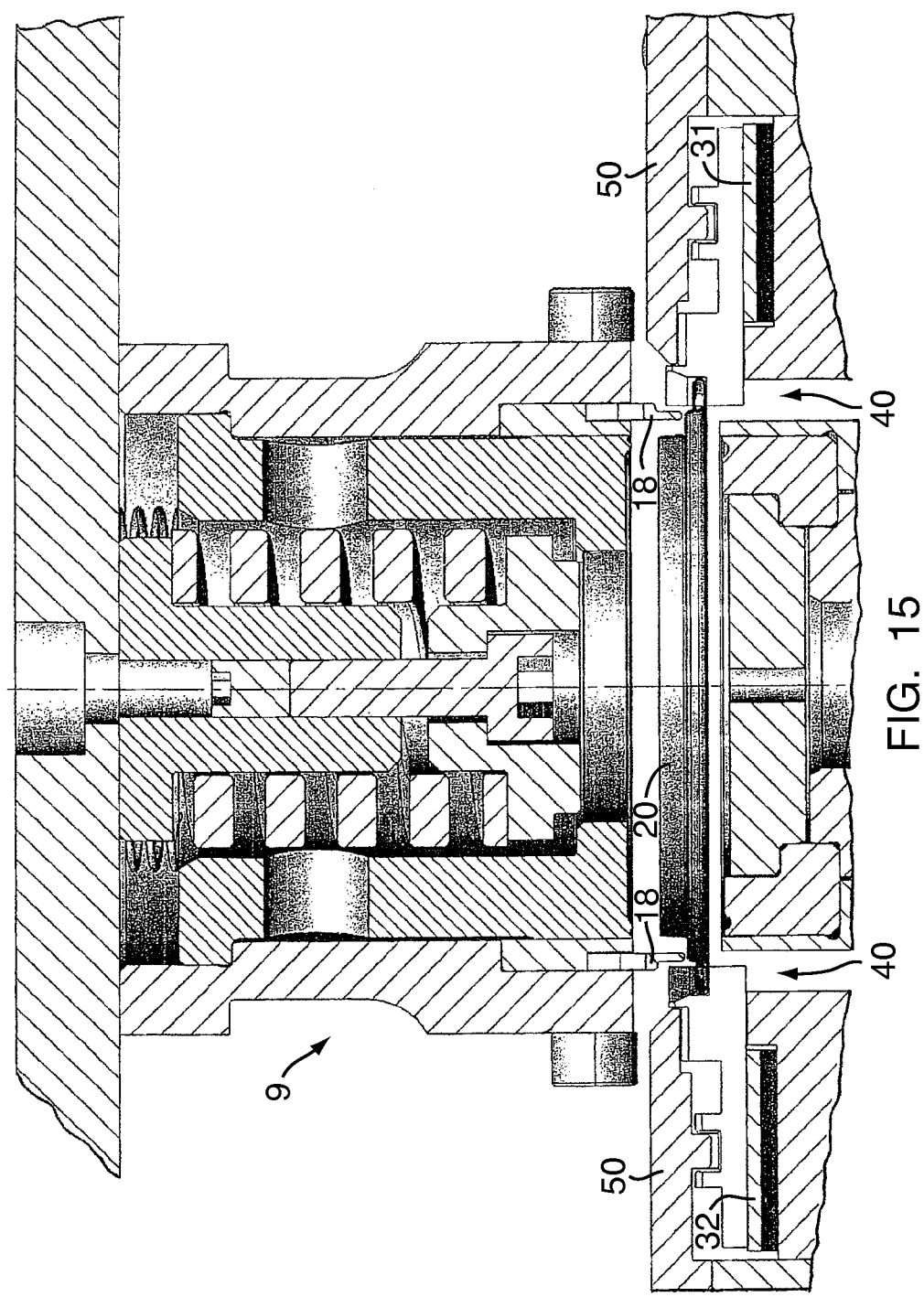
FIG. 15 shows a vertical section view of a part of the processing station for the forming of the edge of the extraction opening.

Thereafter a conveying of the cover blank 20 from the position 2g into the processing station 10 respectively into the position 2h takes place with the next transport step of the transport means, wherein the rolling of the formed edge is carried out. As a difference to FIGS. 1 to 7 the rolling (FIG. 6) therefore occurs in this embodiment already now, before the tear-open foil is sealed. Again, within the rolling process station 10 movable down holders are provided as a securing against the take-off preferably in the upper tool, particularly springily movable down holders 18 with springs 19, as can be seen in the vertically cut part view of this processing station according to FIG. 15.

Figure 16:
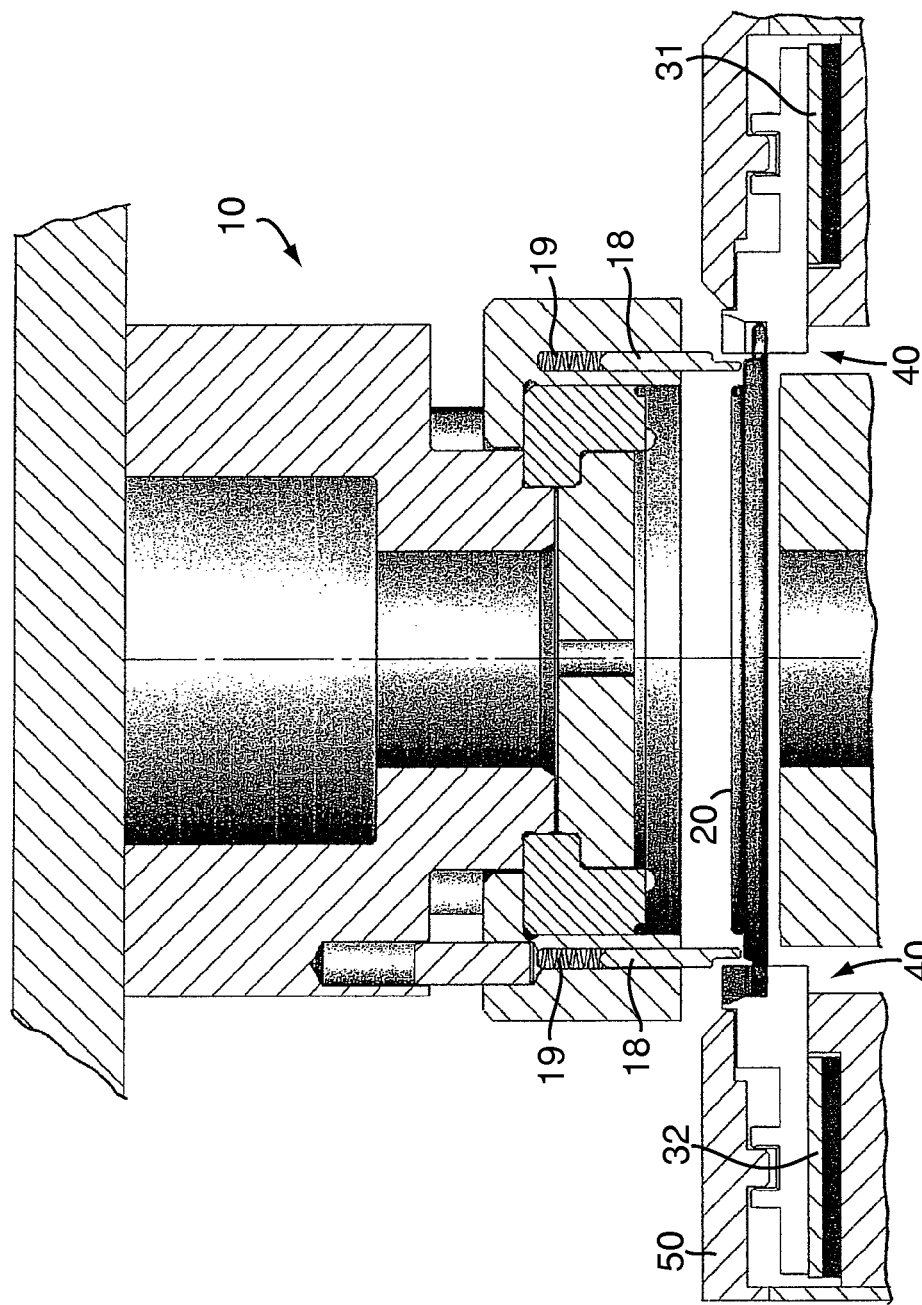
FIG. 16 shows a part of a processing station for the rolling of the formed edge in a partial vertical section view.
Figure 17:
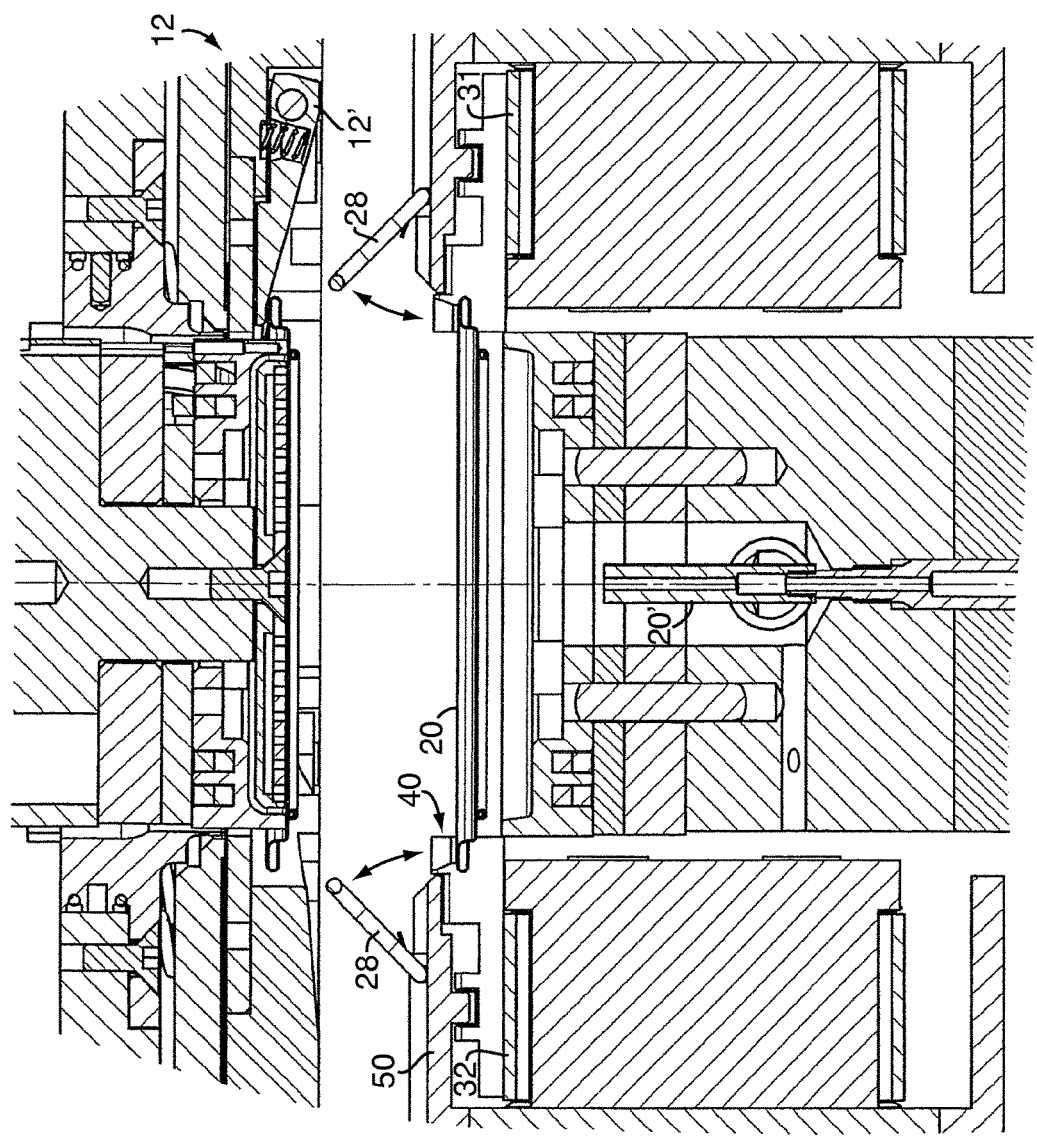
FIG. 17 shows a vertical section view of a part of a processing station for the punching out of the tear-open foil and its pre-sealing onto the cover ring.
Figure 18:
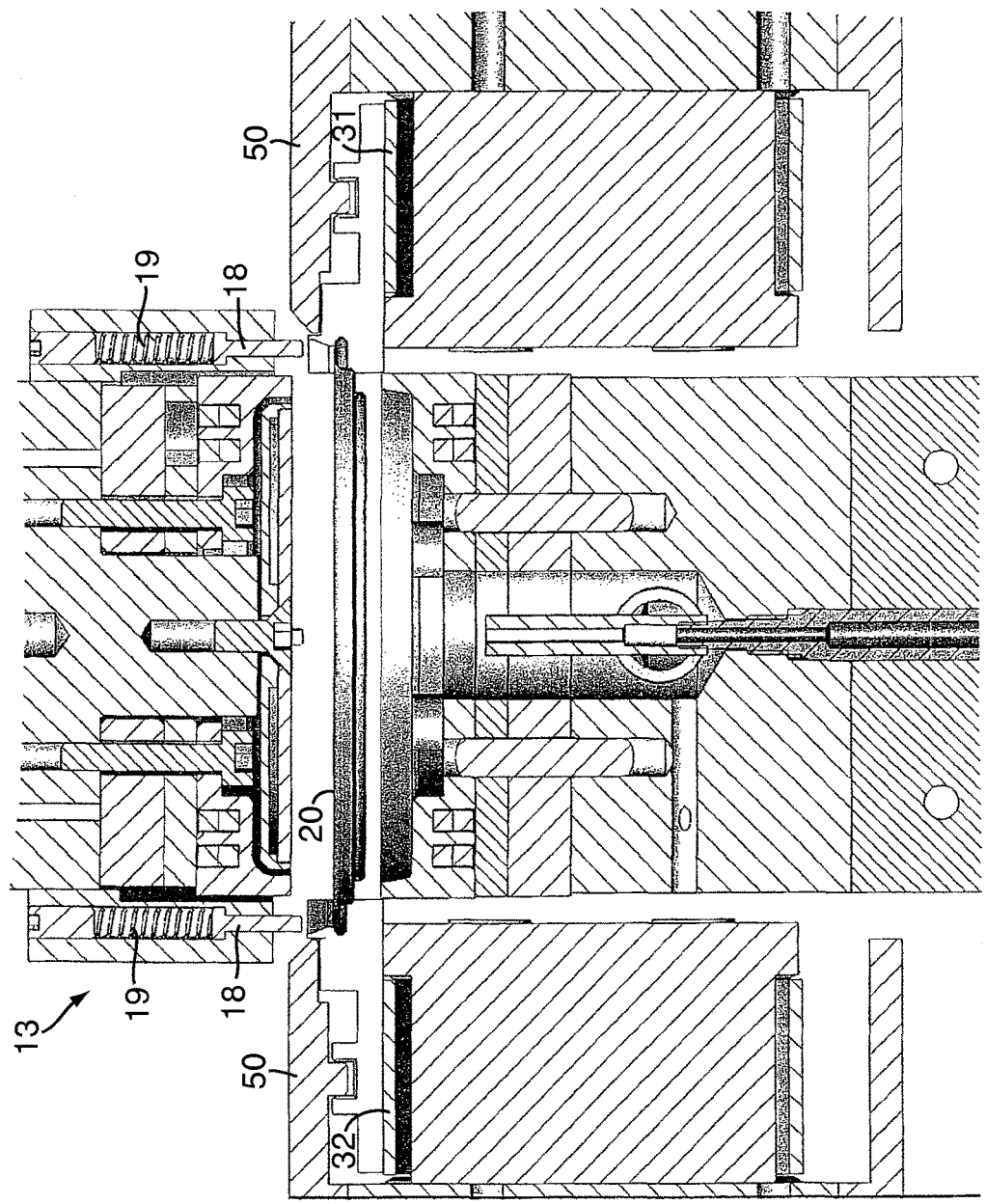
FIG. 18 shows a vertical section view of a part of a processing station for the main sealing.
Figure 19:
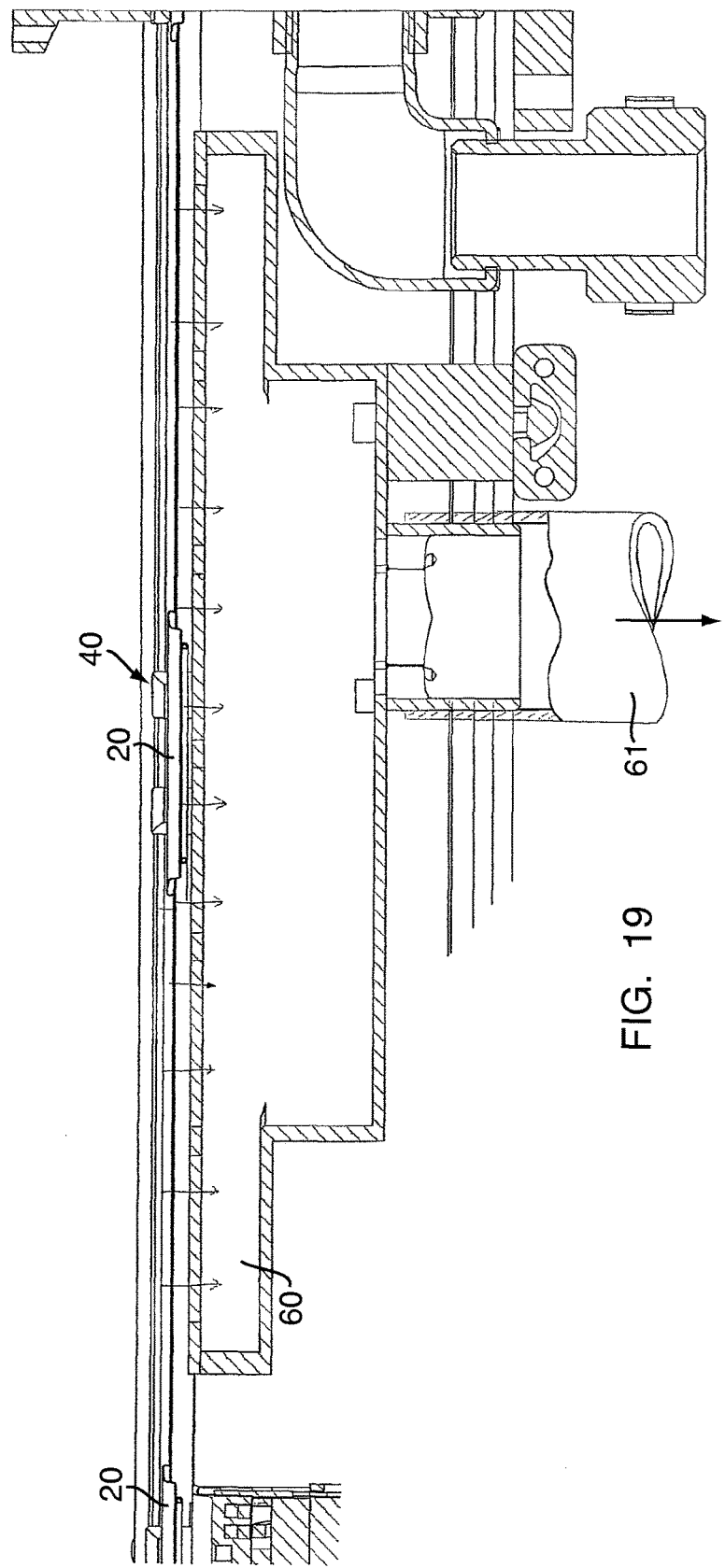
FIG. 19 shows a side section view of the securing by means by vacuum or low-pressure, respectively, in the area of an inspection of the covers.
Figure 20:
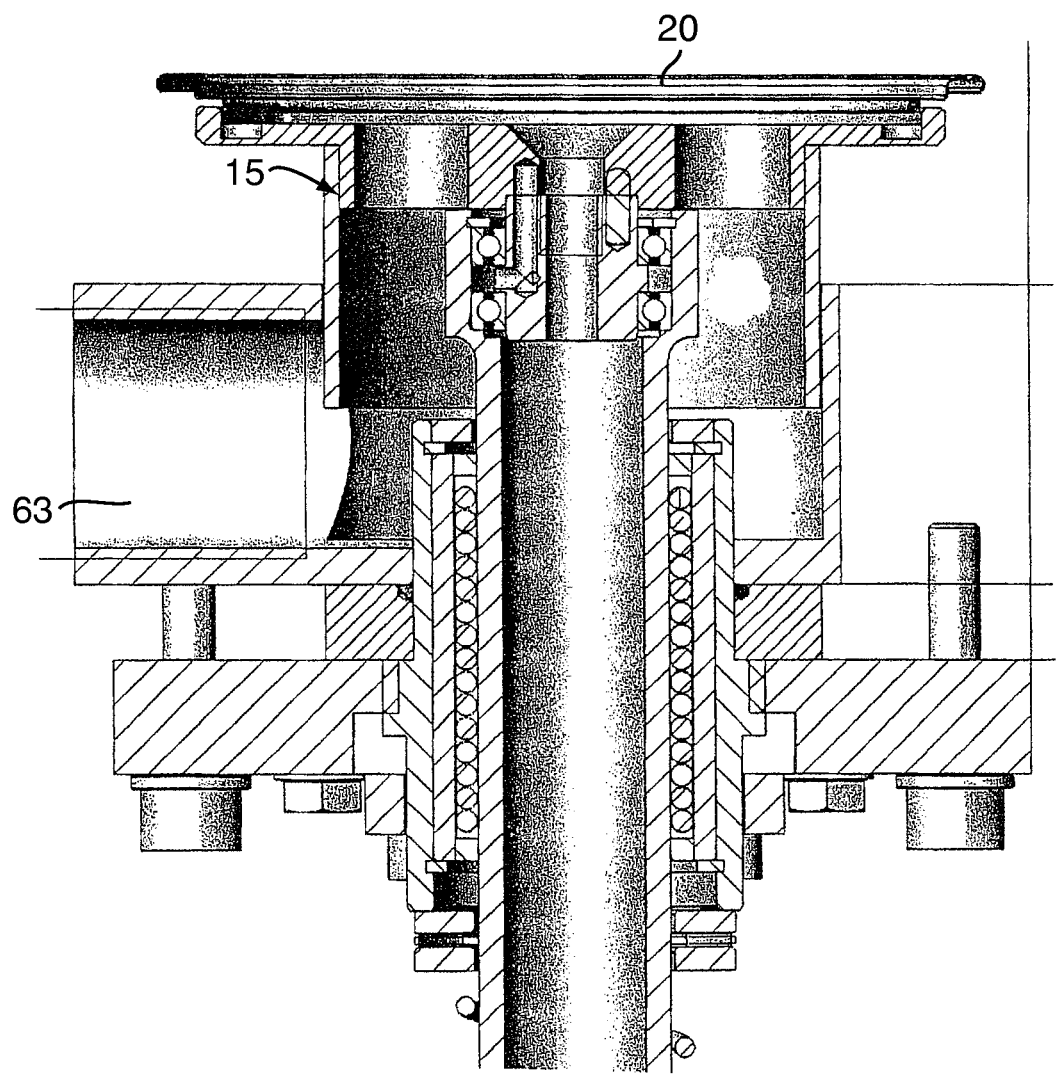
FIG. 20 shows the processing station for cooling and with a turntable for aligning of the tear-open straps.

Subsequently a further step of the transport occurs with the transport into the turning station 11 respectively the position 2i. The cover blank, which has previously been processed as a cover ring with formed and rolled edge, is turned by 180° in the turning station, as can be seen in FIG. 8. A taking out of the cover ring from its reception is carried out by means of the turning station. Thereby a securing is given by the transport means preferably during the insertion, in such a way that the down holders 18 of the rolling process station reach so far along the transport means, that the cover ring is secured until it is itself held within the turning station; however it can also have own securing means during the insertion into the turning station. During the handing over from the turning station, after the turning, into the ready reception of the transport means in the position 2j, a securing by the turning station takes place until the securing along the transport path in the positions 2k and 2l is again taken over by for example a covering 5 with the bridge 5', as can be seen in FIG. 9. After that, the cover ring reaches the punching and pre-sealing station 12 respectively the position 2m, being now arranged with that side up, which has to be supplied with a tear-open foil. In the punching and pre-sealing station the securing against an undesired take-off from the reception takes place preferably my means of movable securing elements which are formed by rotatable securing bars, as can be seen in FIG. 16. The bars constitute the securing against take-off when inserting the cover ring into this processing station in a position rotated downwards. During the appliance of the round foil, which has been punched out of a foil web of the tear-open foil above the reception in a known manner, to the cover ring, the bars are rotated upwards because the sealing tool takes over the securing itself within this step. Because afterwards the cover again forms a closed surface, the securing can again be carried out by means of low pressure in the lower tool after opening of the pre-sealing tool. Along the next transport step into the position 2n, a centrally arranged down holder 6 can take over the securing and afterwards the guidances 5 with bridge 5' are again used to secure the cover with the pre-sealed foil which is applied to the cover ring. This is also valid for the positions 2n and 2o wherein no processing occurs. After that the cover reaches the position 2p respectively the main sealing station 13, wherein a securing can be carried out on the one hand by means of movable, springy arranged down holders, as shown in FIG. 17 with the down holders 18 and their springs 19. In the upper tool there may be discharge handles 12' securing the cover. Additionally or alternatively a securing by means of low pressure can be carried out, while the down holders are not in action. In the main sealing station the finishing sealing of the tear-open foil to the cover ring is done in a known way, which is familiar to the skilled person. After that, the transport into the position 2q is carried out, wherein no processing can be performed and after that into the position 2r, wherein a cooling of the sealing and an aligning of the tear-open strap of the tear-open foil is carried out on a turntable in substantially a known way. However a securing of the cover takes place on the turntable by means of low pressure or vacuum, respectively. As far as no processing occurs along the transport into the position 2q and further into the position 2r, the securing can again be carried out by means of the covering 5 with the bridge 5', which act as unmoved securing elements. If there is an optional inspection of the sealing joint along this transport path is carried out by means of a checking station 14, the securing is carried out only by means of low pressure and the coverings 5 are left out in order for the checking station to have a free sight from above onto the sealing joint. FIG. 19 shows in section view a sucking in case 60 with openings at its upper side and an air inlet duct 61 at its lower side, via which the covers are transported and via which a securing of the covers against a take-off during the transport takes place. In the position 2r with the cooling of the sealing joint and the aligning of the tear-open strap a securing against the take-off from the turntable of this processing station 15 takes place preferably, as mentioned, by means of low pressure, as can be seen in FIG. 20, which shows the turntable and the respective low pressure connector 63. In the processing station 16 respectively in the position 2s the embossing of the tear-open foil (FIG. 6) takes place, wherein vertically arranged down holders, which are held in a springy and movable way, are again preferably used for the securing. Unmovable guidances can be used for securing during the transport between the positions 2r and 2s. During the further transport into the discharge station 17 coverings 5 with bridges 5' are again used.

The generation of vacuum or low pressure, respectively, preferably takes place centrally by means of a vacuum fan and the repartition of the low pressure by means of pipes into the processing stations respectively transport sections. In order to release a cover which is held by low pressure it can be provided that the low pressure area is connected underneath the cover by means of a controlled valve to the ambient pressure or to an air pressure source which generates an over pressure. Thereby the holding respectively the securing by means of low pressure is neutralized fast.

When securing by a vacuum of the cover is mentioned, it is herein encompassed that this vacuum can be generated by a jet of air as well. Taking into account the situation of FIG. 17 it is possible to eject a jet of air by the central air line 20' as long as the cover does not seat on the lugs. Thus a stream of air will pass through the gap between the cover and the lugs generating there a zone of lower pressure due to the higher air velocity in the gap which leads to a seating of the cover into the lugs. Then the jet of air has to be stopped.

Figure 21:
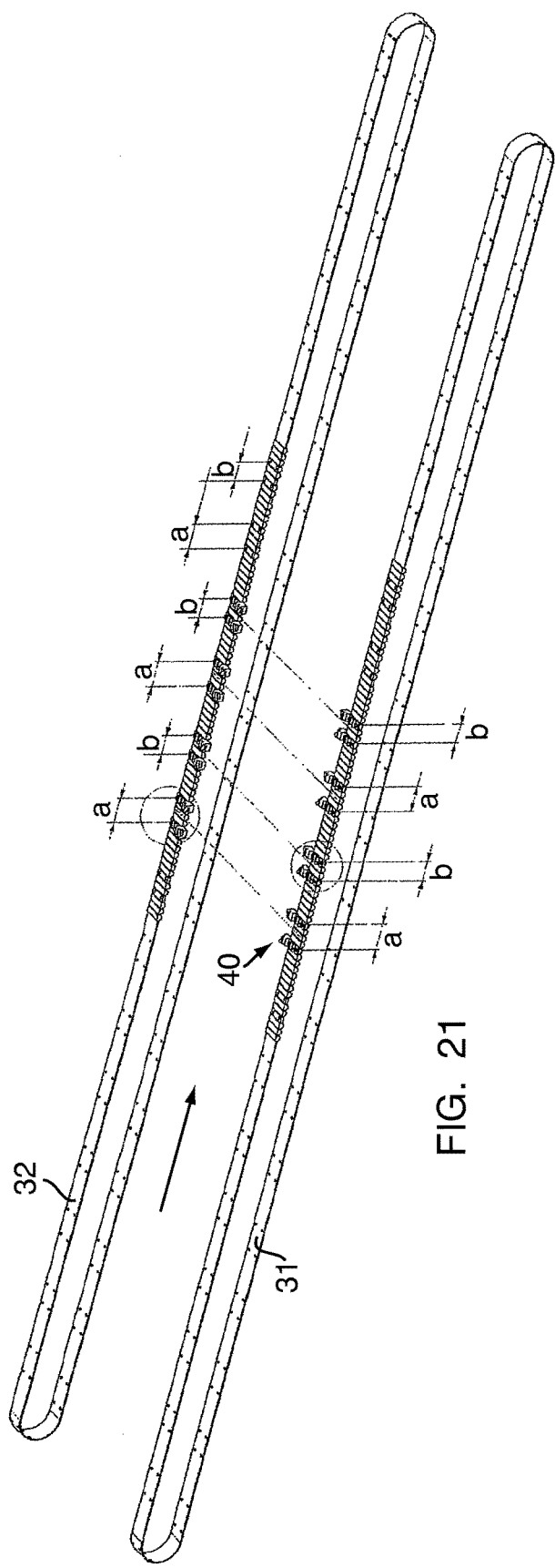
FIG. 21 shows a view of the transport means with entraining lugs, which have different distances from each other and which therefore form receptions for covers of different sizes on the same toothed belt.

Now, a further aspect of the invention is explained by means of FIG. 21. The Figure shows the two toothed belts 31 and 32 of the transport means, which run parallel and are formed by entraining lugs, with a couple of the receptions 40 for the cover blanks respectively covers, which are arranged to them. Now, according to the invention, receptions for two different cover diameters are provided alternatingly one after the other on the toothed belt, such that for example a lug distance "a" of associated entraining lugs, together forming a reception, of for example 30 mm, is followed by a lug distance "b" of associated entraining lugs, together forming a reception, of for example 40 mm, and is then followed again by a lug distance a of 30 mm and again by a lug distance of for example 40 mm etc. This allows in a simple way and without refitting of the transport means, its use for two different diameters of cover blanks respectively covers. If the apparatus for manufacturing tear-open covers is run for production of covers with the higher of the two diameters, only the receptions with the entraining lugs which are located in a larger mutual distance are loaded with cover blanks by the de-stacker. Accordingly, the transport means carries out each individual step with essentially the double step length, because the receptions with the mutually closer located entraining lugs are not used and remain empty and run through the processing stations without stopping there. If the apparatus for manufacturing covers is used for the production of covers with the smaller diameter, only the receptions with the mutually closer located entraining lugs are loaded with cover blanks. Also in this case the transport means carries out steps with an essentially double step length because the respective receptions with the entraining lugs which are located further from each other are not used and run through the processing station without stopping there. In this way two different cover sizes can be manufactured in the apparatus with the same transport means without refitting. The refitting is then limited to the processing stations respectively to the tools used there, as known, however the extensive changing of the toothed belts is omitted.

While there are shown and described presently preferred embodiments of the invention, it is to be distinctly understood that the invention is not limited thereto but may be otherwise variously embodied and practised within the scope of the following claims.

What is claimed is:

1. A method for manufacturing covers with tear-open foils comprising:
  conveying a plurality of cover blanks stepwise through a linear transport means to processing stations arranged along the transport means,
  wherein the linear transport means comprises a plurality of pairs of entraining lugs successively arranged on each side of a longitudinal central axis of the linear transport means,
  wherein the entraining lugs of each pair are alternatingly separated by a first lug distance (a) and a second lug distance (b) along the longitudinal central axis, and
  wherein each of the pairs of entraining lugs opposing each other on both sides of the longitudinal central axis of the linear transport means forms one of a first type of reception having a first lug distance (a) and a second type of reception having a second lug distance (b); and inserting each of the plurality of cover blanks into one of a reception of the first type or a reception of the second type, wherein the linear transport means is actuated with steps positioning either the receptions of the first type or the receptions of the second type at the processing stations.

2. The method according to claim 1, wherein the linear transport means comprises a pair of toothed belts running in parallel and being guided by deflection rollers and having their surfaces in common planes.

3. The method according to claim 2, wherein a mutual distance of the pair of toothed belts is adjustable.

4. The method according to claim 1, comprising:
de-stacking a cover blank from at least one stack using a de-stacker arranged at a beginning of the linear transport means; and
delivering the cover blanks from the at least one de-stacker to the linear transport means.

5. The method according to claim 1, wherein one of the processing stations is a cutting station, an oiling station, a forming station, a rolling station, a turning station, a punching station, a pre-sealing station, a sealing station, a checking station or an embossing station.

6. The method according to claim 1, further comprising:
securing the cover parts against an undesired lift-off from the linear transport means.

7. A method for manufacturing covers with tear-open foils, the method comprising:
conveying a plurality of cover parts substantially horizontally along a manufacturing path using a linear transport means defining a longitudinal central axis, wherein the linear transport means comprises a first belt on a first side of the longitudinal central axis, a second belt on a second side of the longitudinal central axis, a plurality of first receptions and a plurality of second receptions, wherein each of the plurality of first receptions is formed by a pair of entraining lugs arranged in succession on a first belt and a pair of entraining lugs arranged in succession on a second belt, wherein, for each of the plurality of first receptions, the entraining lugs of the pair arranged in succession on the first belt are separated by a first lug distance (a) and the entraining lugs of the pair arranged in succession on the second belt are separated by the first lug distance (a), wherein each of the plurality of second receptions is formed by a pair of entraining lugs arranged in succession on a first belt and a pair of entraining lugs arranged in succession on a second belt, wherein, for each of the plurality of second receptions, the entraining lugs of the pair arranged in succession on the first belt are separated by a second lug distance (b) and the entraining lugs of the pair arranged in succession on the second belt are separated by the second lug distance (b), and wherein the plurality of first receptions and the plurality of second receptions are arranged in alternating order along the longitudinal central axis.

8. The method according to claim 7,
transporting the plurality of cover parts stepwise to a plurality of processing stations along the manufacturing path with steps positioning one of the first plurality of receptions or one of the second plurality of receptions at one of the processing stations.

9. The method according to claim 8, wherein one of the processing stations is a cutting station, an oiling station, a forming station, a rolling station, a turning station, a punching station, a pre-sealing station, a sealing station, a checking station or an embossing station.

10. The method according to claim 7, wherein a distance between the first belt and the second belt transverse to at least one of a direction of motion of the first belt and the second belt or a transport direction of the cover blanks is adjustable.

11. The method according to claim 7, wherein the first belt and the second belt are toothed,
wherein the first belt and the second belt run in parallel, and
wherein the first belt and the second belt are guided by deflection rollers, and wherein the first belt and the second belt have surfaces in common planes.

12. The method according to claim 11, wherein a mutual distance of the pair of toothed belts is adjustable.

13. The method according to claim 7, comprising:
de-stacking a cover blank from at least one stack using a de-stacker arranged at a beginning of the linear transport means; and
delivering the cover blanks from the at least one de-stacker to the linear transport means.

14. The method according to claim 7, further comprising:
securing the cover parts against an undesired lift-off from the linear transport means.

* * * * *